United States Patent
Ballario (10) Patent No.: US 10,514,031 B2
(45) Date of Patent: Dec. 24, 2019

(54) PACKAGING BORE FOR ELIMINATING WASHOUT FAILURE

(71) Applicant: American Manufacturing Innovators, Inc., Walled Lake, MI (US)

(72) Inventor: Dante Ballario, Northville, MI (US)

(73) Assignee: American Manufacturing Innovators, Inc., Walled Lake, MI (US)

( * ) Notice: Subject to any disclaimer, the term of this patent is extended or adjusted under 35 U.S.C. 154(b) by 84 days.

(21) Appl. No.: 15/820,661

(22) Filed: Nov. 22, 2017

(65) Prior Publication Data

US 2018/0156212 A1 Jun. 7, 2018

Related U.S. Application Data (60) Provisional application No. 62/425,377, filed on Nov. 22, 2016.

(51) Int. Cl.
| | |
|---|---|
| *F04B 53/22* | (2006.01) |
| *F04B 53/16* | (2006.01) |
| *C21D 1/08* | (2006.01) |
| *F16J 15/20* | (2006.01) |
| *F16J 15/18* | (2006.01) |
| *F04B 39/12* | (2006.01) |

(52) U.S. Cl.
CPC ............. *F04B 53/22* (2013.01); *C21D 1/08* (2013.01); *F04B 39/122* (2013.01); *F04B 53/16* (2013.01); *F04B 53/164* (2013.01); *F04B 53/168* (2013.01); *F16J 15/184* (2013.01); *F16J 15/20* (2013.01)

(58) Field of Classification Search
CPC ........ F04B 53/22; F04B 53/16; F04B 53/164; F04B 39/122
See application file for complete search history.

(56) References Cited

U.S. PATENT DOCUMENTS

| | | | |
|---|---|---|---|
| 7,484,452 B2 * | 2/2009 | Baxter | F04B 39/10 417/539 |
| 8,845,823 B2 | 9/2014 | Christiansen et al. | |
| 9,188,123 B2 * | 11/2015 | Hubenschmidt | F04B 53/007 |

(Continued)

OTHER PUBLICATIONS

Nowell, Mark. "The 5 Failures of Fluid Ends." Upstream Pumping, Oct. 2016. Accessed Nov. 15, 2016, http://www.upstreampumping.com/article/well-completion-stimulation/2016/5-failures-fluid-ends.

*Primary Examiner* — Thomas E Lazo
(74) *Attorney, Agent, or Firm* — Warn Partners, P.C.

(57) ABSTRACT

A high hardness sleeve or surface treatment to a predetermined hardness is used in a packing bore for a fluid end of a pump assembly. The bore is either treated to provide the hardness or a sleeve is used which is fitted in an oversized bore for preventing washout failure. The sleeve is welded into the pump block and machined to the proper size bore. Thereafter the bore is protected from washout failure at this location. Alternatively, a surface of the sleeve is polished which further reduces the wear on the part. The sleeve can be a stainless steel material hardened by heat treating process or otherwise treated or carbon steel sleeves with the predetermined bore hardness which could be welded into a suitable bore in the pump. However, other processes for hardening the stainless steel can be used as long as desired predetermined surface hardness is maintainable.

18 Claims, 4 Drawing Sheets

(56) References Cited

U.S. PATENT DOCUMENTS

| | | | |
|---|---|---|---|
| 2007/0273105 A1* | 11/2007 | Stanton | F04B 53/164 277/500 |
| 2012/0213651 A1* | 8/2012 | Ochoa | F04B 53/007 417/437 |
| 2013/0319220 A1 | 12/2013 | Luharuka et al. | |
| 2014/0048180 A1 | 2/2014 | Christiansen et al. | |
| 2015/0132079 A1 | 5/2015 | Christiansen et al. | |
| 2018/0156212 A1* | 6/2018 | Ballario | F04B 53/16 |

\* cited by examiner

PACKAGING BORE FOR ELIMINATING WASHOUT FAILURE

CROSS REFERENCE TO RELATED APPLICATIONS

This application claims the benefit of U.S. Provisional Application No. 62/425,377, filed Nov. 22, 2016.

FIELD OF THE INVENTION

The present invention relates in general to pumps and more specifically to an insert or surface treatment for fluid end plunge pumps.

BACKGROUND OF THE INVENTION

A fluid end is a high-pressure, reciprocating pump which contains a bore where the plunger reciprocates. Fluid ends could have several plungers and its corresponding plunger bores. It is public knowledge in the pressure pumping industry that packing bore washout is one of the leading causes of fluid end failure. In addition, typical steel uses about 32 Rockwell C hardness where washout and cavitation are a problem. Further, typical steel processing has to be forced casting at about 14,000-15,000 psi. The steel is machined to particular client specifications.

Paragraphs below are described in an article written by Mark Nowell, believed to be the owner of a pump/valve source. It was published in Upstream Pumping Magazine in October 2016, which outline problems and failures in fluid ends. The author defines "Packing Bore Washouts" as the number 2 cause of Fluid Ends' Failure. See Nowell, Mark. "The 5 Failures of Fluid Ends." *Upstream Pumping*, October, 2016. Accessed Nov. 15, 2016, http://www.upstream-pumping.com/article/well-completion-stimulation/2016/5-failures-fluid-ends, all of which is incorporated herein by reference thereto.

The article sets out common problems to avoid for longer equipment life. "The fluid end is a critical component of the pressure pumping industry. Fluid ends also can be the biggest heartburn for frac companies when they fail prematurely. Extreme environments such as 100 mesh frac sands, ever-increasing pressures, recycled water, advanced chemicals and slickwater all contribute to fluid end failure in as little as 100 to 500 pumping hours. In today's market, that is an expensive problem. This article looks at five consistent failure points of the frac fluid end. Solving these problems can extend the life of the fluid end and reduce the cost per hour. Given the industry's current climate, saving money and increasing profitability and productivity are a big win." Id.

Another failure is described as packing bore washouts. "Properly maintaining fluid ends in high-cycle environments is not easy, since packing bores can wash out at any time. If a packing or grease system fails, the packing bore gets cut by the high-pressure water, causing it to lose its ability to seal. The use of stainless steel fluid ends achieves higher cycle hours, but with those longer hours of operation, the packing begins to wear into the packing bore, creating waves. This is called washboarding.

Eventually, the packing bore becomes so severely washboarded that the packing will not seal. Washouts and washboarding can be weld repaired, but that drastically reduces the strength of the fluid end because welded material cannot compare to the strength of forged stainless steel. Weld repairs lower the endurance limit of the fluid end at the surface.

Cracks in stainless fluid ends are found more frequently in welded areas than in non-welded areas." Id.

A known stuffing box sleeve does not house the seal on the outside diameter, transferring seal wear from the body to the replaceable sleeve.

"The best solution for packing bore problems was invented many years ago when reciprocating pump companies began using removable stuffing boxes or stuffing box sleeves in their pumps. Stuffing boxes house the packing that goes into the fluid end, becoming a sacrificial piece.

Washouts still occur when using stuffing boxes, but instead of weakening the fluid end by weld repairs, transferring the wear to the replaceable stuffing box is a better solution.

Stuffing boxes and sleeves are a move in the right direction, but the issue of a solid seal remains. Because the outside diameter of the boxes and sleeves must seal on the inside diameter of the fluid end, the sealing area becomes washboarded and wears out the fluid end, just like the packing in the bore." Id.

Figure 5:
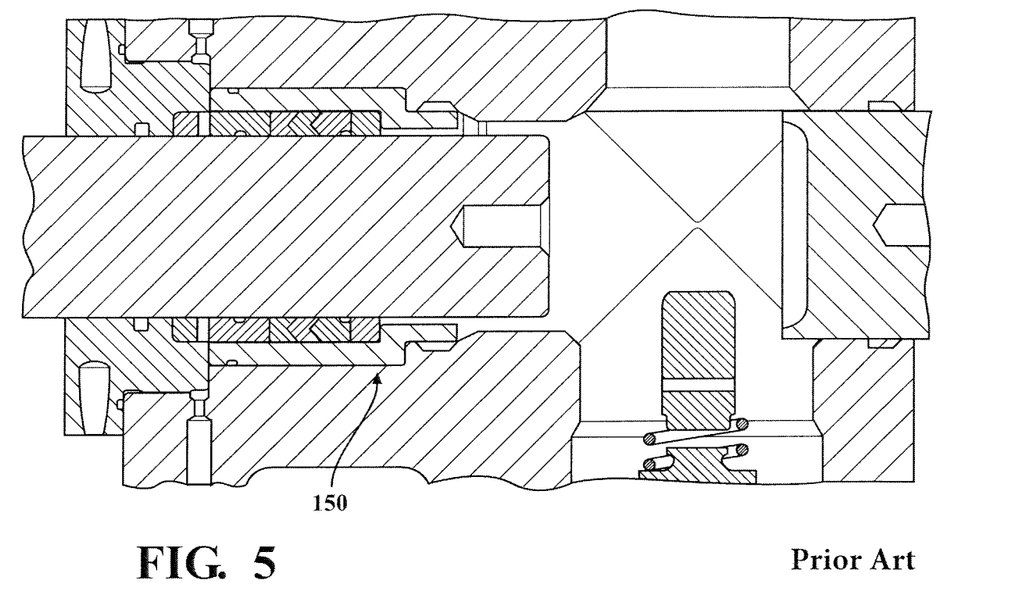
FIG. 5 is a cross sectional view of a conventional sleeved stuffing box to fight washouts by becoming a sacrificial piece.

An attempt to solve these sealing problems is known. "Instead of using off-the-shelf seals that may not provide the best seal, they use engineered seals that fit perfectly into a groove machined into the fluid end. This new solution provides a more consistent and reliable seal while transferring the wear from the inside diameter of the fluid end to the outside diameter of the stuffing box sleeve. Now the stuffing box sleeve is a sacrificial piece in two places: on the inside diameter where the packing seals and the outside diameter against the fluid end." Id. The sleeved stuffing box, indicated generally at 150, fights washouts by becoming a sacrificial piece (see FIG. 5 of the present application).

The instant Applicant submits that there have been numerous attempts in the industry to overcome the wear issues with fluid ends. Some of these attempts will now be explained, as follows:

Weld repair: This solution is the most widely used, and consists of machining the washed-out packing bore over-sized, adding a layer of welded material, and then re-machining the packing bore to its specification size. The welded material is softer than the originally forged parent metal, and eventually fails faster during pumping.

Replaceable the stuffing box (described in the article set forth previously): This solution adds complexity to the fluid ends in both, their initial assembly and their maintenance on-the-field, because it increases the number of components it requires a separate stuffing box and additional seals. It also adds complexity to the machining of the fluid ends blocks, which require a complete redesign on the packing bore area. Moreover, since the stuffing boxes are replaceable pieces, because they are still affected by washout, the cost of the fluid end increases over its lifetime.

Figure 6:
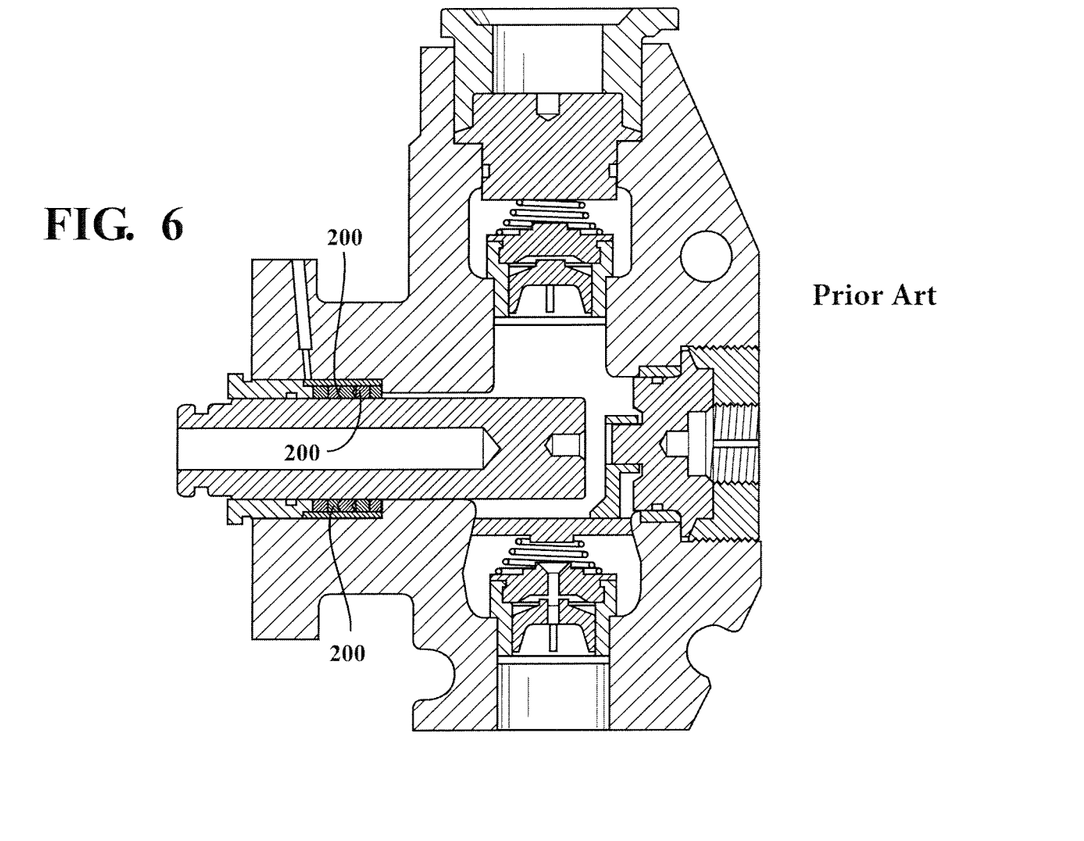
FIG. 6 is a cross sectional view of a conventional pump body portion having an insert.

An abrasive resistant insert (constructed of a ceramic, zirconium, or a composite material) indicated generally at 200: This expensive solution is cumbersome and complex to manufacture. It is also complex for the mechanical features to keep the insert in place, adding several components and more machining to the fluid end (see FIG. 6 of the present application). FIG. 6 in the present application corresponds to FIG. 5 of U.S. Patent Publication No. US 2013/0319220 A1, to Luharuka et al, publication date Dec. 5, 2013, all of which is incorporated herein by reference thereto.

The problem with the above mentioned solutions is that the sealing areas are prone to washboarding and the washout problem still remains unsolved.

Accordingly, there remains a need for an effective hardened insert or liner for fluid ends with a predetermined hardness for increased durability and minimizing washout problems.

SUMMARY OF THE INVENTION

The present invention includes a fluid end provided with a liner made out of hardened stainless steel or any steel that could be hardened and welded. This liner considerably improves fluid end life by minimizing the washout failure mode.

A high hardness sleeve or surface treatment of from about 40 to 76 Rockwell C hardness, typically, from 50 to 70, preferably, 55 to 70, and, most preferably, 60 to 65 is used in a packing bore for a fluid end of a pump assembly, e.g., fluid end for oil, gas, or any type of high pressured pump medium, etc. A particularly preferred pump assembly is a fracking pump assembly. The bore is either treated to provide the hardness, or, in a preferred embodiment, a sleeve is used which is fitted in an oversized bore. The sleeve is attached, most preferably welded, into the pump block and machined to the proper size bore. Thereafter the bore is protected from washout failure at this location potentially for the life of the pump. Alternatively, the operable surface of the sleeve can be polished to mirror like surface of from 5 to 30 micro inch surface finish which further reduces the wear on the part. Preferably, a heat treated stainless steel is used having predetermined properties for at least minimizing washout failure. Most preferably the sleeve is a stainless steel material hardened by the Expanite™ process. However, other processes for hardening the stainless steel can be used as long as the above surface hardnesses can be maintained. While not preferred carbon steel sleeves with a bore hardness as set forth above which could be welded into a suitable bore in the pump. Pumps can have 1-5 or more of these per pump block.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the FIGS. 1-4C generally, there is provided a high hardness bushing (e.g., sleeve) or surface treatment to a predetermined hardness used in a packing bore for a fluid end of a pump assembly, e.g., fracking pump assembly, high pressure pump assembly for predetermined medium flow, etc. The hardness is from about 40 to 76 Rockwell C hardness (HRC), typically, from 50-70 HRC, preferably, from 55 to 70, more preferably, from 60 to 65 HRC, most preferably, at least 65 HRC. However, other predetermined hardness ranges that are more or less depending on the particular application and predetermined requirements are contemplated without departure from the scope of the present invention. In one embodiment a stainless steel sleeve is heat treated to a surface hardness of 74-76 HRC and a core to about 64 HRC.

The bore is either treated to provide the hardness or a sleeve is used which is fitted in an oversized bore. The sleeve is welded into the pump block and machined to the proper size bore. Thereafter the bore is protected from washout failure at this location potentially for the life of the pump. Alternatively, the operable surface of the sleeve is polished which further reduces the wear on the part. The sleeve is preferably a stainless steel material hardened by a predetermined process. The sleeve can be a stainless steel material, e.g., a stainless steel material that has been prepared using a predetermined suitable method of heat treating stainless steel depending on the application and predetermined properties required. A particularly preferred sleeve material for use in the present invention is a stainless steel material hardened by and available from Expanite™, having a place of business in Cleveland, Ohio. However, other processes for hardening the stainless steel can be used as long as the above predetermined surface hardness is maintainable. Further information regarding the present invention including a process of heat treating can be gleaned from U.S. Patent Publication No. US 2015/0132079, published on May 14, 2015, U.S. Patent Publication No. US 2014/0048180, published on Feb. 20, 2014, and U.S. Pat. No. 8,845,823, dated Sep. 30, 2014, all of which are incorporated herein by reference thereto. However, other processes for hardening can be used as long as the above predetermined surface hardness is maintainable. Alternatively, a carbon steel sleeve with the predetermined bore hardness is used which could be welded into a suitable bore in the pump.

This technical solution for minimizing the washout problem on fluid ends involves a hardened stainless steel or carbon steel liner. This proprietary liner is pressed into the fluid end packing bore, welded in place, and then machined to fluid end bore specifications.

This stainless steel liner is manufactured according to our proprietary specification, and once installed it becomes a seamless part of the fluid end. The heat treatment on the liner is a process of high-temperature solution-nitriding, which pushes nitrogen deep into the stainless steel liner material. This re-establishes the core hardness of the material, which creates a unique load-bearing capacity and insures corrosion resistance.

There are numerous advantages of the hardened liner of the present invention, including: no additional assembly parts are needed in the fluid end, and it is machined and assembled according to its original design; it uses industry standard packing bore seals and components; provides a packing bore inside diameter surface hardness that is extremely higher than parent metal; provides superior wear and corrosion resistance; it is totally transparent to the current fluid end design, no design changes necessary; it applies to either stainless steel or carbon steel fluid ends; and it can be adapted for other/different pump designs in areas where washout or cavitation problems affect performance.

Figure 1:
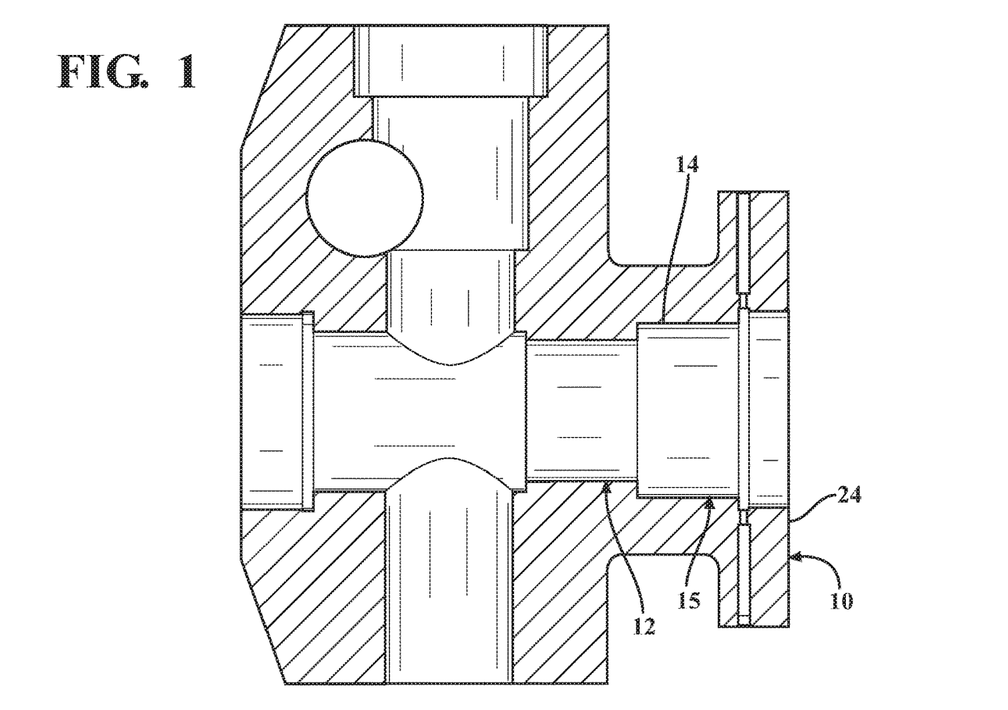
FIG. 1 is a cross section view of a VOV fluid end with a liner or "packing bore sleeve"; according to an embodiment of the present invention.
Figure 3:
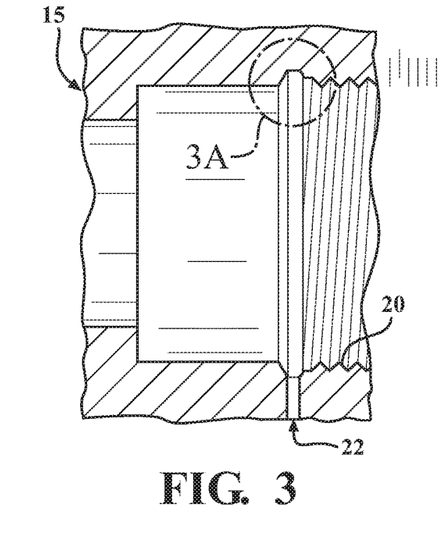
FIG. 3 is an enlarged side view of the machined block with liner of FIG. 1, in accordance with the present invention.
Figure 3A:
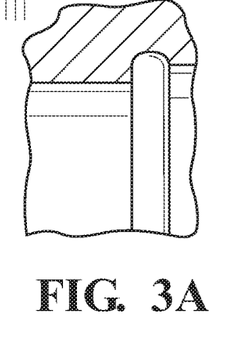
FIG. 3A is an enlarged side view of "3A" taken from FIG. 3, in accordance with the present invention.
Figure 3B:
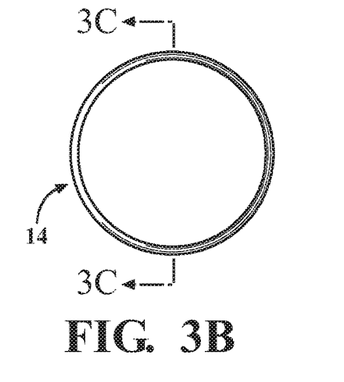
FIG. 3B is a front view of the packing bore sleeve of FIG. 1, in accordance with the present invention.
Figures 3C, 3D:
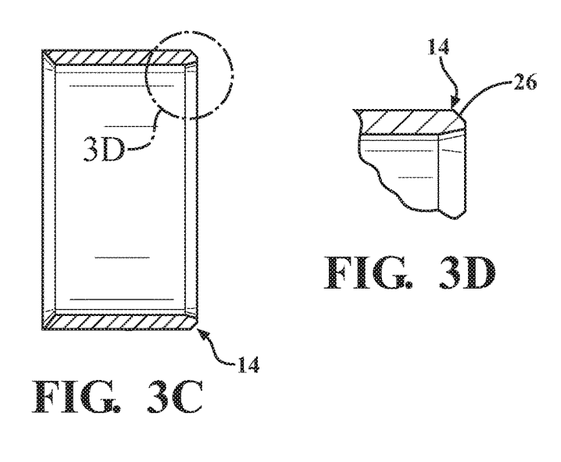
FIG. 3C is a cross sectional view taken from 3C-3C in FIG. 3B, in accordance with the present invention.
FIG. 3D is a detailed side view of "3D" taken from FIG. 3C, in accordance with the present invention.
Figure 3E:
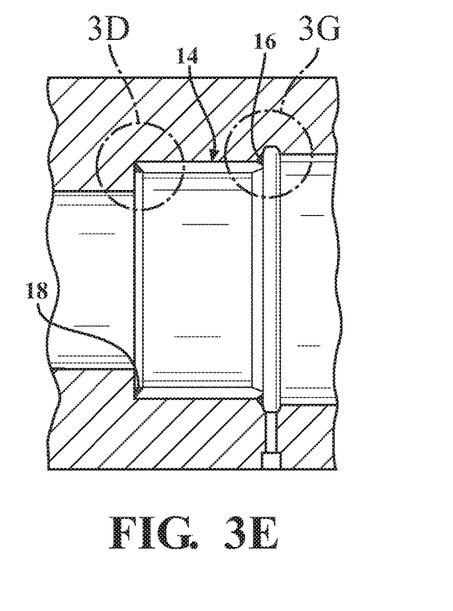
FIG. 3E is a side view of FIG. 3 illustrating first and second weld, in accordance with the present invention.
Figure 3F:
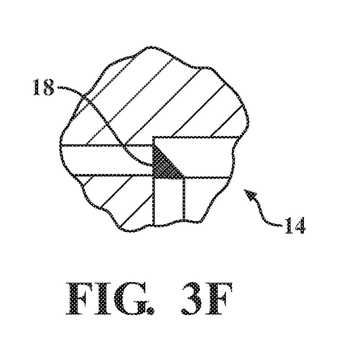
FIG. 3F is a detailed view of "3G" taken from FIG. 3E, in accordance with the present invention.
Figure 3G:
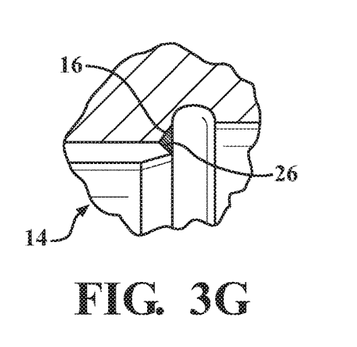
FIG. 3G is a detailed view of "3F" taken from FIG. 3E in accordance with the present invention.

Referring now to FIGS. 1 and 3-3G generally, there is depicted a fluid end assembly shown generally at 10 including a packing bore portion shown generally at 12. At least one packing bore sleeve 14 (or "liner" or "insert") is operably fitted into a machined block portion (shown generally at 15) of the packing bore 12. In this embodiment, the fluid end is a VOV-style fluid end (or "valve-over-valve" fluid end), however, the liner 14 is operably adaptable for using with any fluid end depending on the application without departure from the scope of the present invention. In a particularly preferred embodiment, the sleeve 14, after insertion into the machined block 15 of the bore 12, is operably welded in place, and then operably machined to predetermined fluid end bore 12 specifications. The sleeve 14 substantially becomes a seamless part of the fluid end bore 12.

The sleeve 14 is welded in at least one, preferably at least two, locations; a first weld 16 that is a continuous weld on a top diameter surface of the sleeve 14 and a second weld 18 that is a continuous weld on a bottom diameter surface of the sleeve 14. "Top" and "bottom" refers generally to the sleeve 14 with respect to an axis alone the bore 12 for fluid flow. Preferably, the first weld 16 continuous weld located toward an outer diameter surface of the sleeve 14 toward the outer end of the sleeve 14 with respect to the installed position or any predetermined location on the outer diameter. Preferably, the second weld 18 is a continuous weld located toward an inner diameter surface of the sleeve 14 toward the inner end of the sleeve 14, with respect to the installed position, or any predetermined location on the inner diameter. Most preferably, the sleeve 26 is provided with an angled surface 26 to provide a weld surface on the sleeve 14 for the first weld 16.

More or less welds are contemplated depending on the application without departure from the scope of the present invention. Optionally, at least one fastener, e.g., rivet, threads, etc) for further attachment of the sleeve 14 is contemplated depending on the application without departure from the scope of the present invention.

The sleeve 14 is a metal sleeve, preferably, a stainless steel liner or carbon steel liner, most preferably a stainless steel liner, manufactured according to a predetermined process operable to meet predetermined requirements and specifications depending on the particular application. In a particularly preferred embodiment, the heat treatment of the sleeve 14 is a process of high-temperature solution-nitriding, which pushes nitrogen deep into the stainless steel liner material. This re-establishes the core hardness of the material, which creates a unique load-bearing capacity and insures corrosion resistance.

In an embodiment of the present invention, the outer diameter of the sleeve 14 (as a raw material sleeve) is at least 4 inches, typically, about 5-8 inches, preferably about 5.3 to 7.7 inches, most preferably about 5.75 to 7.5 inches. In an embodiment of the present invention, the outer diameter of the sleeve 14 (as finished machined sleeve) is at least 4 inches, typically at least 4.75 inches, preferably about 4.9 to 7 inches, most preferably about 5 to 6.9 inches.

In an embodiment of the present invention, the inner diameter of the sleeve 14 (as a raw material sleeve) is at least 3.75 inches, typically, about 4 to 6.5 inches, preferably about 4.25-6.26 inches, most preferably about 4.25 to 6 inches. In an embodiment of the present invention, the inner diameter of the sleeve 14 (as finished machined sleeve) is at least 4 inches, typically, about 4.5 to 7 inches, preferably about 4.6 to 6.75 inches, most preferably about 4.7 to 6.5 inches.

In an embodiment of the present invention, the length of the sleeve 14 (as a raw material sleeve) is at least 3 inches, typically, about 3 to 4 inches, preferably about 3 to 3.75 inches, most preferably about 3.25 to 3.75 inches. In an embodiment of the present invention, the length of the sleeve 14 (as finished machined sleeve) is at least 2.75 inches, typically, about 3 to 4 inches, preferably about 3 to 3.75 inches, most preferably about 3 to 3.6 inches.

A predetermined finish bore depth, predetermined finish thread depth, predetermined total stock for finish bore, predetermined finish bore diameter, and predetermined thread depending on the application are achieved according to the present invention.

It is understood that, alternatively, at least a portion of the packing bore 12, e.g., at machined block 15, is treated to provide the hardness set forth previously.

FIGS. 3B-3G further depict the sleeve 14 of FIG. 1 and weld areas 16,18, and FIGS. 3-3A depict the machined block 15 including a buttress thread 20, e.g., hydraulic sealing thread with predetermined thread profile, for operably attaching and sealing to a fluid end body portion 24 or other component of the fluid end. Alternative, or additional, mechanical connection(s) are contemplated without departure from the scope of the present invention. At least one lubrication delivery path shown generally at 22 is also illustrated, preferably in fluid communication with the bore portion 12.

Figure 2:
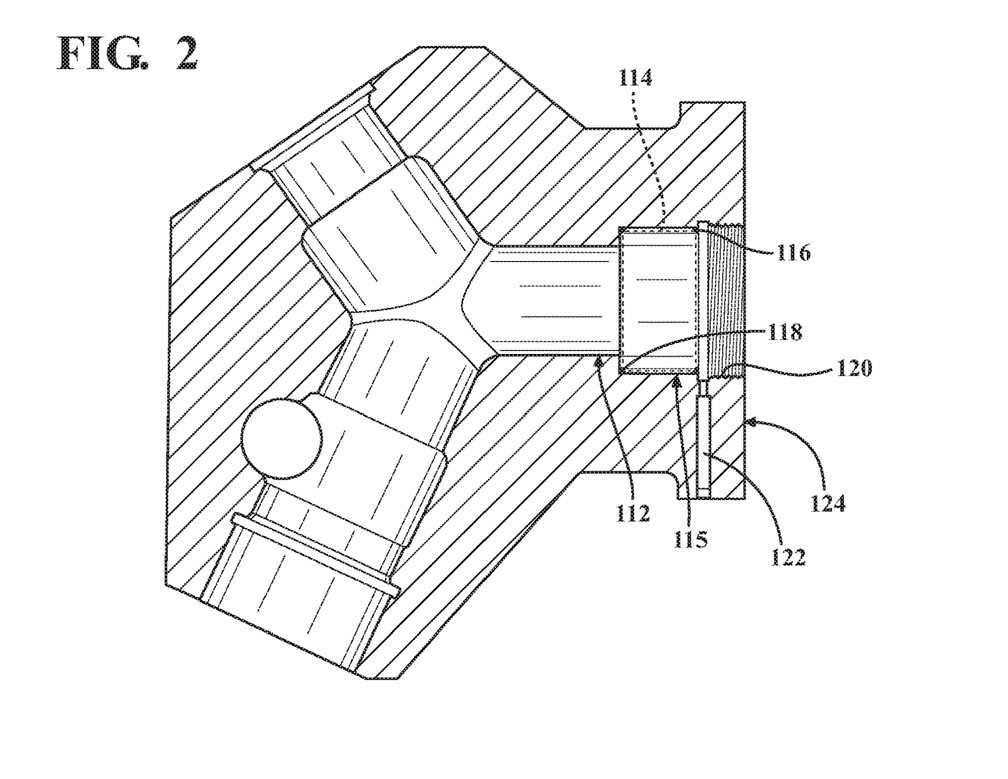
FIG. 2 is a cross section view of a Y block fluid end with a liner; according to an embodiment of the present invention.
Figures 4, 4A:
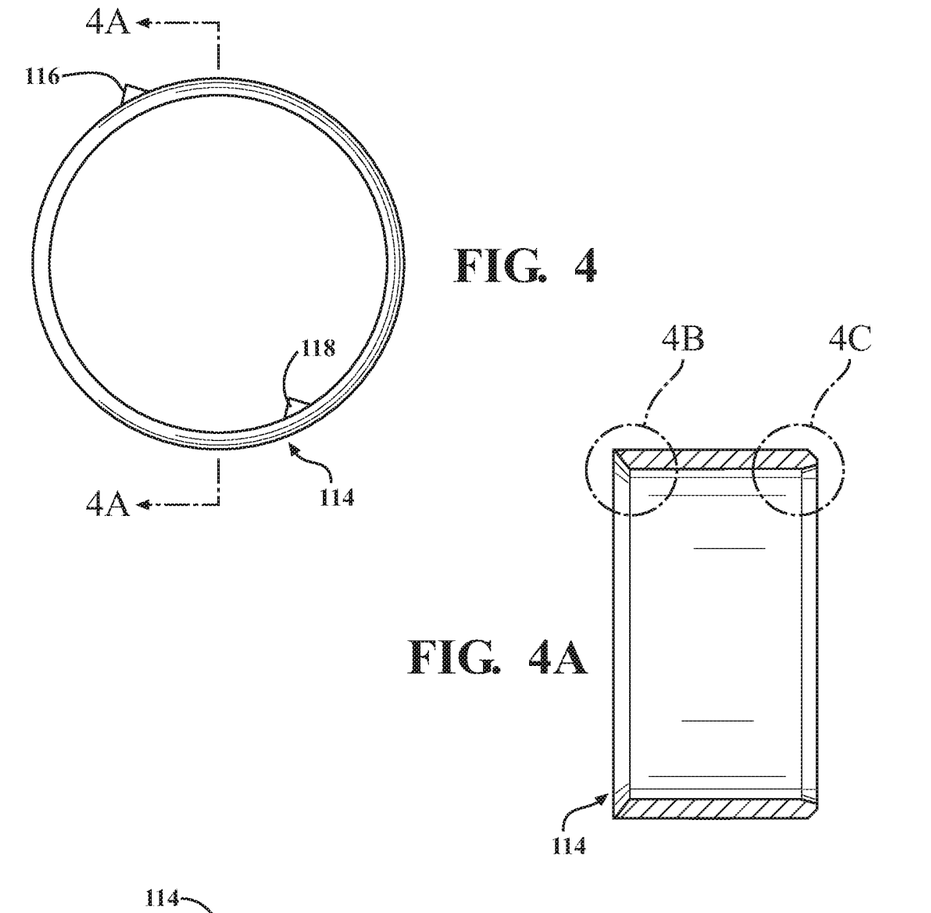
FIG. 4 is a front view of the packing bore sleeve of FIG. 2, in accordance with the present invention.
FIG. 4A is a cross sectional view taken from "4A-4A" in FIG. 4, in accordance with the present invention.
Figure 4B:
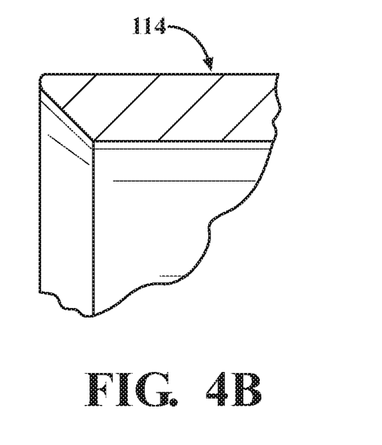
FIG. 4B is a detailed view of "4B" taken from FIG. 4A, in accordance with the present invention.
Figure 4C:
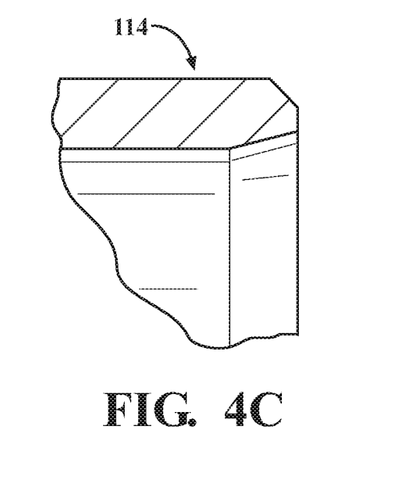
FIG. 4C is a detailed view of "4C" taken from FIG. 4A, in accordance with the present invention.

Referring now to FIGS. 2 and 4-4C generally, there is depicted a fluid end assembly shown generally at 100 including a packing bore portion shown generally at 112. At least one packing bore sleeve 114 (or "liner" or "insert") is operably fitted into a machined block shown generally at 115 of the packing bore 112. This embodiment is identical to the previous embodiment, however, in this embodiment the fluid end is a Y-style fluid end. It is understood that the liner 114 is operably adaptable for using with any fluid end depending on the application without departure from the scope of the present invention. In a particularly preferred embodiment, the sleeve 114, after insertion into the bore 112, is operably welded in place, and then operably machined to predetermined fluid end bore 112 specifications (e.g., machined to remove excess weld, etc). The sleeve 114 substantially becomes a seamless part of the fluid end bore 112. The sleeve 114 is welded in at least one, preferably at least two, locations; a first weld 116 that is a continuous weld (e.g., continuous weld located toward a top diameter surface of the sleeve 114) and a second weld 18 that is a continuous weld (e.g., continuous weld located toward a bottom diameter surface of the sleeve 114).

It is contemplated that the sleeves 14 and 114 are different or the same, preferably, substantially similar corresponding features and respective packing bore interaction as further detailed above.

FIGS. 4 to 4C are enlarged views of sleeve 114 of the fluid end assembly 100 of FIG. 2, including the weld areas 116,118. The sleeve 114 is welded in at least one, preferably at least two, locations; a first weld 116 that is a continuous weld (e.g., continuous weld located toward an outer diameter surface of the sleeve 114 toward the outer end of the sleeve 114 or any predetermined location on the outer diameter) and a second weld 118 that is a continuous weld (e.g., continuous weld located toward an inner diameter surface of the sleeve 114 toward the inner end of the sleeve 114, with respect to the installed position, or any predetermined location on the inner diameter). More or less welds are contemplated depending on the application without departure from the scope of the present invention. Optionally, at least one fastener, e.g., rivet, threads, etc) for further attachment of the sleeve 114 is contemplated depending on the application without departure from the scope of the present invention.

It is understood that, alternatively, at least a portion of the packing bore portion 112, e.g., at machined block 115 area, is treated to provide the hardness set forth previously.

FIG. 2 also depicts the machined block 115 including a buttress thread 120, e.g., hydraulic sealing thread with predetermined thread profile, for operably attaching and sealing to a fluid end body portion 110 or other component of the fluid end. Alternative, or additional, mechanical connection(s) are contemplated without departure from the scope of the present invention. At least one lubrication delivery path shown generally at 122 is also illustrated, preferably in fluid communication with the bore portion 112.

Referring to the figures generally, optionally, the process further includes operably masking weld area(s) prior to heat treatment to avoid heat treatment on weld areas (e.g., angled surface 26, sleeve weld surface for the first weld 16,116, sleeve weld surface for the second weld 18,118, and/or packing bore, etc) or on the outer diameter of the sleeve 14,114. Optionally, the process further includes operably freezing the sleeve 14,114 after heat treatment. Optionally, the process includes shot peening the weld. It is further contemplated that any alternative bushing profile is contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A high-pressure reciprocating pump, comprising:
   a machined block operably coupled in fluid communication with a fluid medium flow at a fluid end of the pump;
   a packing bore portion that is surface treated to a predetermined hardness effective to protect the packing bore portion from washout failure; and/or
   a packing bore sleeve that is a pre-hardened steel having a predetermined hardness effective for reducing packing bore washout, said packing bore sleeve is operably connected to the packing bore portion, wherein the packing bore sleeve creates a seamless part to the machined block to reduce packing bore washout;
   wherein the packing bore sleeve is welded in place with a plurality of welds.

2. The high-pressure reciprocating pump of claim 1, wherein the pump is a fluid end plunge pump.

3. The high-pressure reciprocating pump of claim 1, wherein the pump is a valve over valve fluid end pump.

4. The high-pressure reciprocating pump of claim 1, wherein the pump is a Y-fluid end pump.

5. The high-pressure reciprocating pump of claim 1, wherein the packing bore sleeve is stainless steel or carbon steel.

6. The high-pressure reciprocating pump of claim 1, wherein the packing bore sleeve is welded at a first weld to a first surface of the sleeve and at a second weld to a second surface of the sleeve.

7. The high-pressure reciprocating pump of claim 6, wherein the sleeve includes at least one angled surface to provide a weld surface on the sleeve for the first weld.

8. The high-pressure reciprocating pump of claim 6, wherein the packing bore sleeve is machined after welding to predetermined packing bore portion dimensions for desired fluid medium flow.

9. The high-pressure reciprocating pump of claim 1, wherein the packing bore sleeve is stainless steel and the packing bore sleeve is heat treated with a predetermined high-temperature solution-nitriding to push nitrogen into the stainless steel packing bore sleeve material to re-establish the predetermined core hardness of the sleeve.

10. The high-pressure reciprocating pump of claim 1, wherein the high hardness sleeve or surface treatment is from about 40 to 76 Rockwell C hardness used in the packing bore portion for the fluid end of a fracking pump assembly.

11. The high-pressure reciprocating pump of claim 1, wherein the high hardness sleeve or surface treatment is from 50-70 Rockwell C hardness.

12. The high-pressure reciprocating pump of claim 1, wherein the high hardness sleeve or surface treatment is 60 to 70 Rockwell C hardness.

13. The high-pressure reciprocating pump of claim 1, wherein the machined block is operably connected at a packing bore portion of the pump.

14. The high-pressure reciprocating pump of claim 1, further comprising buttress threads to seal the machined block against a fluid end area of the pump.

15. A method of manufacturing a fluid end for a high-pressure pump, comprising:
   providing a packing bore portion;
   optionally, heat treating the packing bore portion;
   providing at least one machined block with a buttress thread for connecting the machined block within the packing bore portion;
   providing at least one packing bore sleeve;
   treating the packing bore sleeve to a hardness of from about 40 to 76 50- 70 Rockwell C hardness;

pressing the packing bore sleeve into the machined block;
welding the packing bore sleeve to the machined block;
machining the packing bore sleeve inner diameter to provide a seamless fluid end bore having predetermined dimensions for desired fluid medium flow through the packing bore portion;
wherein the packing bore sleeve protects the packing bore portion against washout failure.

16. The method of claim 15, wherein machining comprises polishing an operable inner surface of at least the packing bore sleeve from about 5 to 30 micro inch surface finish, which further reduces the wear on the pump.

17. The method of claim 15, wherein welding the packing bore sleeve further comprises welding a first continuous weld at a first angled surface on the packing bore sleeve and welding a second continuous weld at a second location on the packing bore sleeve.

18. The method of claim 15, wherein the packing bore sleeve is stainless steel or carbon steel.

\* \* \* \* \*